United States Patent
Watts et al.

(10) Patent No.: US 12,412,175 B2
(45) Date of Patent: Sep. 9, 2025

(54) TECHNOLOGIES FOR MANAGING TRANSACTION ORDER FOR A BLOCKCHAIN

(71) Applicant: FASTLANE LABS, INC., Pasadena, CA (US)

(72) Inventors: David Alex Watts, Arcadia, CA (US); Eric Destaing, Sarzeau (FR); Jordan Blayne Hagan, Manly (AU)

(73) Assignee: FASTLANE LABS, INC., Pasadena, CA (US)

( * ) Notice: Subject to any disclaimer, the term of this patent is extended or adjusted under 35 U.S.C. 154(b) by 48 days.

(21) Appl. No.: 18/386,138

(22) Filed: Nov. 1, 2023

(65) Prior Publication Data

US 2025/0139616 A1    May 1, 2025

(51) Int. Cl.
  *G06Q 40/04*  (2012.01)
  *G06Q 20/06*  (2012.01)
  *G06Q 20/38*  (2012.01)

(52) U.S. Cl.
  CPC ........ *G06Q 20/389* (2013.01); *G06Q 20/0658* (2013.01); *G06Q 40/04* (2013.01); *G06Q 2220/00* (2013.01)

(58) Field of Classification Search
  CPC .............................. G06Q 20/389; G06Q 40/04
  USPC ....................................................... 705/35, 37
  See application file for complete search history.

(56) References Cited

U.S. PATENT DOCUMENTS

| | | | |
|---|---|---|---|
| 2019/0082007 A1* | 3/2019 | Klarman | H04L 63/123 |
| 2021/0209567 A1* | 7/2021 | Jing | G06Q 20/102 |
| 2022/0156665 A1* | 5/2022 | Beth | G05D 1/0276 |
| 2023/0073427 A1* | 3/2023 | Berg | G06Q 20/389 |

FOREIGN PATENT DOCUMENTS

EP           3832574 A2 *  6/2021   ............. G06F 17/18

OTHER PUBLICATIONS

Combating Front-running in the Blockchain Ecosystem Byers, Jack (Year: 2022).*
https://www.flashbots.net/, Flashbots, 2024 Flashbots, Ltd,; Retrieved from the internet on: Feb. 7, 2024.
https://www.jito.wtf/; Earn more with Jito's Solana MEV Software; Retrieved from the internet on: Feb. 7, 2024.
https://docs.marlin.org/user-guides/polygon-mev/, Polygon MEV; Retrieved from the Internet on: Feb. 7, 2024.

* cited by examiner

*Primary Examiner* — William E Rankins
(74) *Attorney, Agent, or Firm* — MARSHALL, GERSTEIN & BORUN LLP

(57) ABSTRACT

Systems and methods for managing transactions associated with a blockchain are provided. According to aspects, a blockchain scaling solution may include a sentry component configured to facilitate an auction during which transactions may be received. The sentry component may sort the transactions according to bid amount size and provide the sorted transactions to a validator component. Further, the validator component may invoke an auction smart contract that may execute the transaction that arrives first. The transaction may successfully complete if the corresponding bid amount is successfully transferred, where the validator component may be entitled to the corresponding bid amount.

16 Claims, 6 Drawing Sheets

TECHNOLOGIES FOR MANAGING TRANSACTION ORDER FOR A BLOCKCHAIN

FIELD

The present disclosure is directed to blockchain technologies. More particularly, the present disclosure is directed to platforms and technologies for managing transactions for a blockchain.

BACKGROUND

A "Layer-1" blockchain is the foundational layer of a blockchain system, representing the primary protocol where the native blockchain logic operates. It encompasses the main network infrastructure, consensus mechanism, and the native token for the protocol. Additionally, a "Layer-2" scaling solution refers to a protocol that operates on top of a Layer-1 blockchain to improve its scalability and throughput without changing its main infrastructure. Generally, these solutions handle transactions off the main blockchain, processing them more efficiently, and then updating the underlying blockchain with a consolidated result. This allows for faster and cheaper transactions while leveraging the security of the base layer.

For example, Polygon is a Layer-2 solution that aims to address the scalability and usability issues of the Ethereum blockchain while ensuring the benefits of decentralization and security. One of its primary goals is to provide a platform for faster and cheaper transactions without compromising on the core principles of blockchain technology. A Layer-2 solution may include validators used to validate and add new transactions to the blockchain, each of which includes a validator node which is the main node responsible for producing blocks and participating in consensus, and a sentry node that communicates with the public network and passes on relevant information to the validator nodes, thus acting as a firewall and ensuring that validator nodes are not directly exposed to potential attackers.

Layer-2 solutions can employ a mempool (or memory pool) that is a temporary holding space for transactions waiting to be included in a block, and a protocol (e.g., the gossip protocol) used by nodes to share information with their peers, and ultimately propagate transactions and blocks. However, existing Layer-2 solutions introduce latency issues that may lead to delays in transactions being recorded on the blockchain. Additionally, existing solutions suffer from transaction spam, lack of revenue for validators, and an inefficient market for transaction submitters, among other drawbacks.

Accordingly, there is an opportunity to employ various techniques and technologies to address these drawbacks associated with Layer-2 scaling solutions.

SUMMARY

In an embodiment, a computer-implemented method of managing transactions associated with a blockchain. The computer-implemented method may include: receiving, by a sentry node associated with the blockchain, a plurality of transactions respectively from a plurality of submitting devices, wherein each transaction of the plurality of transactions specifies a bid amount in cryptocurrency; sorting, by the sentry node, the plurality of transactions according to the bid amount of each transaction of the plurality of transactions; sending, by the sentry node to a validator node, the plurality of transactions such that the plurality of transactions arrive at the validator node according to an order in which the plurality of transactions are sorted; and executing, by an auction smart contract, a transaction of the plurality of transactions that arrives first at the validator node.

In another embodiment, a system for managing transactions associated a blockchain may be provided. The system may include a sentry node associated with the blockchain and configured to: receive a plurality of transactions respectively from a plurality of submitting devices, wherein each transaction of the plurality of transactions specifies a bid amount in cryptocurrency, sort the plurality of transactions according to the bid amount of each transaction of the plurality of transactions, and send, to a validator node, the plurality of transactions such that the plurality of transactions arrive at the validator node according to an order in which the plurality of transactions are sorted. The system may further include the validator node configured to invoke an auction smart contract to execute a transaction of the plurality of transactions that arrives first at the validator node.

Further, in an embodiment, a non-transitory computer-readable storage medium configured to store instructions executable by one or more processors may be provided. The instructions may include: instructions for receiving, by a sentry node associated with a blockchain, a plurality of transactions respectively from a plurality of submitting devices, wherein each transaction of the plurality of transactions specifies a bid amount in cryptocurrency; instructions for sorting, by the sentry node, the plurality of transactions according to the bid amount of each transaction of the plurality of transactions; instructions for sending, by the sentry node to a validator node, the plurality of transactions such that the plurality of transactions arrive at the validator node according to an order in which the plurality of transactions are sorted; and instructions for executing, by an auction smart contract, a transaction of the plurality of transactions that arrives first at the validator node.

DETAILED DESCRIPTION

Figure 1:
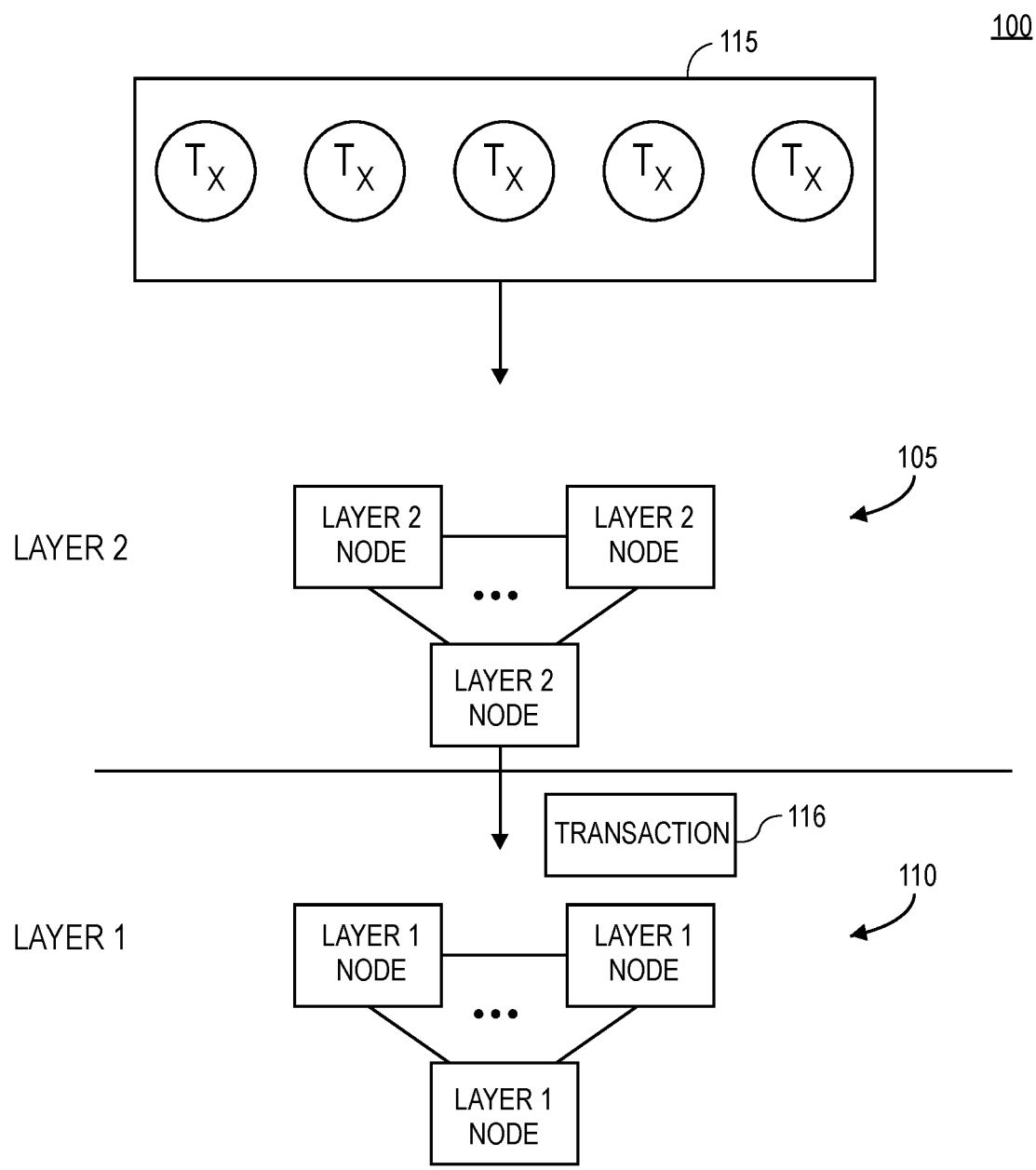
FIG. 1 depicts an overview of components associated with a blockchain and a Layer-2 scaling solution, in accordance with some embodiments.

The present embodiments may relate to, inter alia, platforms and technologies for facilitating and managing transactions associated with a blockchain. According to certain aspects, systems and methods support a Layer-2 scaling solution that manages the ordering and execution of transactions on an underlying blockchain.

Generally, the systems and methods may support a decentralized peer-to-peer network of nodes that cooperate and communicate to produce a blockchain. According to embodiments, there may be a plurality of nodes (e.g., thousands of nodes) in the network that communicate via a peer-to-peer (p2p) network, however there are a limited number of nodes (e.g., around one hundred nodes) that have permissions to build and propose the addition of new blocks to the blockchain. The nodes that have these permissions may be referred to as "validators", and each typically runs two types of nodes: a "sentry node" and a "validator node." Generally, a given validator node is connected to one or more of the sentry nodes, and the sentry nodes then accept connections from the rest of the network on behalf of the validator node, which may protect against Denial of Service (DOS) attacks against the validator node which could halt block production on the network.

According to embodiments, each block that is added to a blockchain can contain one or more transactions that have been executed as part of the addition of the block to the blockchain. For a validator node to be able to consider a transaction for inclusion in an upcoming block, the validator node may initially access data about the transaction. Transaction visibility within the network may be handled through a "memory pool" or "mempool" where pending transactions are temporarily stored before being included in a block. Users of a particular node are able to add a pending transaction to a mempool for that node. Every node in the network may have a mempool, and the nodes in the network use a "gossip" protocol to try to converge on a consistent view of the set of transactions in the mempool across all nodes.

In existing systems, there is an inherent delay in the process of transaction propagation throughout the peer-to-peer network due to the way the gossip protocol is designed. In most cases, in addition to regular network latency, there is an additional delay of 500 ms between when a transaction first reaches the mempool, and when it is received by a validator node and becomes a candidate for inclusion in the next block. In particular, when a node gossips a transaction to its peers, the node immediately sends the entire transaction to a random small percentage (e.g., the square root of n_peers) of its peers which is known as "direct propagation", and sends the transaction headers to the remainder of its peers, which is known as "indirect propagation" and which introduces about a 500 ms delay for those peers before they will see the full transaction in their mempool. In most of the network in which nodes have many connections into the network (e.g., about 200), transactions tend to efficiently propagate directly to most nodes in the network. However, due to the limited number of peers connected to a validator node (e.g., somewhere between 3 and 10), the chance that it will receive an individual transaction by direct propagation is very low.

Further, in existing systems, when a given validator is building a block, transactions are included in the block in decreasing order of their "gas" price, or the amount a submitting user is willing to pay for its transaction to be included on the blockchain. Further, if two transactions have exactly the same gas price, then those transactions will be included in the order they were first seen by the node. A common transaction pattern that users (e.g., traders) attempt to utilize is known as a "backrun," whereby the users monitor the mempool for a transaction that will create an opportunity they want to trade based on, and then attempt to create a transaction that will immediately follow the opportunity transaction in an upcoming block. This can be a competitive process, and often results in a lot of transaction spam (i.e., unsuccessful transactions) in the network as traders attempt to exactly follow the propagation pattern of the opportunity transaction through the network.

According to the present embodiments, the systems and methods improve on these shortcomings by, among other ways, enabling a validator to influence the order of transactions for inclusion within an upcoming block by adjusting the sentry nodes of the validator to eliminate the chance that a transaction will be directly propagated to the validator node. As a result, this ensures a consistent 500 ms delay for all transactions from the sentry node to the validator node. This, in turn, eliminates the incentive for spam transactions. The systems and methods also incorporate an additional sentry component which receives special "bundle" transactions from users containing a bid for the right to be the transaction that immediately follows the opportunity transaction. Before the 500 ms window expires, these transactions are ordered based on their bid price and sent, in order, to the validator node. These bundle transactions then interact with a smart contract to ensure that only the first successful transaction is able to execute, and that the bid fee is collected and distributed to the validator.

Thus, the described embodiments represent an improvement over existing technologies, including blockchain technologies. In particular, the embodiments reduce transaction spam by removing the incentive for "searchers" to send multiple transactions for the same opportunity. Further, the embodiments improve network health by monetizing and optimizing transaction propagation bottlenecks between validators and searchers. These improvements are achieved without delaying transactions more than already possible, altering validator transaction ordering rules, facilitating sandwich attacks, or requiring custom validator code. Additionally, the embodiments create an open market for searchers to efficiently compete for arbitrage opportunities and increase incentives for users to stake with participating validators.

Further still, the embodiments remove randomness in transaction propagation from searchers to validators by ensuring the opportunity transaction and searcher transactions follow the same propagation path, thus preventing mismatched timing. Additionally, the embodiments implement a short auction mechanism for searchers to bid for priority ordering behind opportunity transactions, thus reducing the incentive for spamming the network. Further, sentry nodes are patched to remove direct propagation to validators, thus ensuring propagation through a controlled path. As an additional improvement, opportunity transactions are widely propagated to allow for an open bidding market. Additionally, a system of validator vaults and searcher contracts is implemented for escrow and payment, where searchers must pay their bid or otherwise the transaction reverts, and validators are paid from the validator vaults. Further still, validators can participate without any custom code changes on their nodes. Moreover, the faster internal node network improves propagation speed. It should be appreciated that additional improvements on existing technologies are envisioned.

FIG. 1 illustrates an overview of a system 100 of components configured to facilitate the described systems and methods. It should be appreciated that the system 100 is merely an example and that alternative or additional components are envisioned.

As illustrated in FIG. 1, the system 100 may include a set of nodes 110 associated with a Layer-1 blockchain (e.g., Ethereum). According to embodiments, each node of the set of nodes 110 may be a computer or server participating in the Layer-1 blockchain network, where each node may have a copy of the entire blockchain ledger, which contains a record of all transactions and smart contracts executed on the network, thus providing transparency and enabling for the validation of past transactions. The set of nodes 110 may communicate with each other using a peer-to-peer (p2p) network protocol, and may form a distributed network where each node is connected to multiple other nodes, thereby allowing for information propagation and consensus building. Generally, the set of nodes 110 may share new transactions, blocks, and other network-related information among themselves.

In operating and facilitating the Layer-1 blockchain, the set of nodes 110 may verify transactions by validating their authenticity, ensuring that they adhere to the rules of the network (i.e., consensus rules), and verifying the digital signatures. Additionally, the set of nodes 110 may validate new blocks proposed by validators, such as checking the validity of the transactions within a block and confirming that the block adheres to the consensus rules, and reject any transactions or blocks that violate the consensus rules, thus preventing double-spending and other attacks. Further, the set of nodes 110 may participate in the consensus algorithm of the blockchain network (e.g., Proof of Work or Proof of Stake), and may contribute computational power or stake to secure the network and add new blocks to the blockchain.

The system 100 may further include a set of nodes 105 associated with a Layer-2 scaling solution. According to embodiments, each node of the set of nodes 105 may be a computer or server that operates on top of the Layer-1 blockchain. While each node of the set of nodes 105 may not be responsible for maintaining a full copy of the ledger of the underlying Layer-1 blockchain, each node may manage off-chain channels or networks that enable faster and cheaper transactions.

In operating and facilitating the Layer-2 scaling solution, the set of nodes 105 may communicate through various Layer-2 protocols and networks such as payment channels, sidechains, or state channels. Generally, communication may be performed off-chain such that a given transaction and/or smart contract interaction may happen without involving the Layer-1 blockchain, thus resulting in faster and more scalable transactions.

According to embodiments, the set of nodes 105 may facilitate the execution of smart contracts and the processing of transactions. In particular, to deploy a smart contract, a user or developer may interact with a compatible wallet or development environment to initiate the contract deployment transaction, specifying the bytecode and constructor parameters of the smart contract, whereby this transaction is then broadcast to the network. The set of nodes 105 may include validator nodes that may process the contract deployment transaction by validating the transaction, ensuring that it adheres to the rules of the network, and executing it within the execution environment of the blockchain. When the bytecode of the smart contract is executed, a new contract is deployed on the blockchain. Once deployed, the smart contract may receive interactions and function calls from users and decentralized applications (dApps). Users may send transactions 115 to interact with the smart contract, specifying the function to execute and any relevant parameters. According to embodiments, the transactions 115 may include a bundle of transactions submitted by users, wherein each bundle of transactions may include an opportunity-creating transaction as well as a transaction that specifies a bid amount and invokes an auction smart contract.

Generally, certain transactions may be managed off-chain and within the network associated with the Layer-2 scaling solution. However, certain transactions (e.g., a transaction 116 as illustrated in FIG. 1) may need to be settled on the Layer-1 blockchain for security or other reasons, such as transactions that involve asset transfers between the Layer-2 scaling solution and the Layer-1 blockchain, or other transactions. In embodiments, the transaction 116 may be the "winning" transaction of the transactions 115 that results from an opportunity auction. Bridge nodes within the Layer-2 network may facilitate communication between the Layer-2 scaling solution and the Layer-1 blockchain, and validator nodes may validate and process the transaction 116, thus ensuring its correctness and adherence to the bridge protocol. Validators on both the Layer-2 scaling solution and Layer-1 blockchain network may confirm the validity of the transaction and, once confirmed, any transferred assets may be unlocked and the transaction is considered settled. Finally, the Layer-1 blockchain may confirm and finalize the transaction by recording it on the common ledger.

Figure 2:
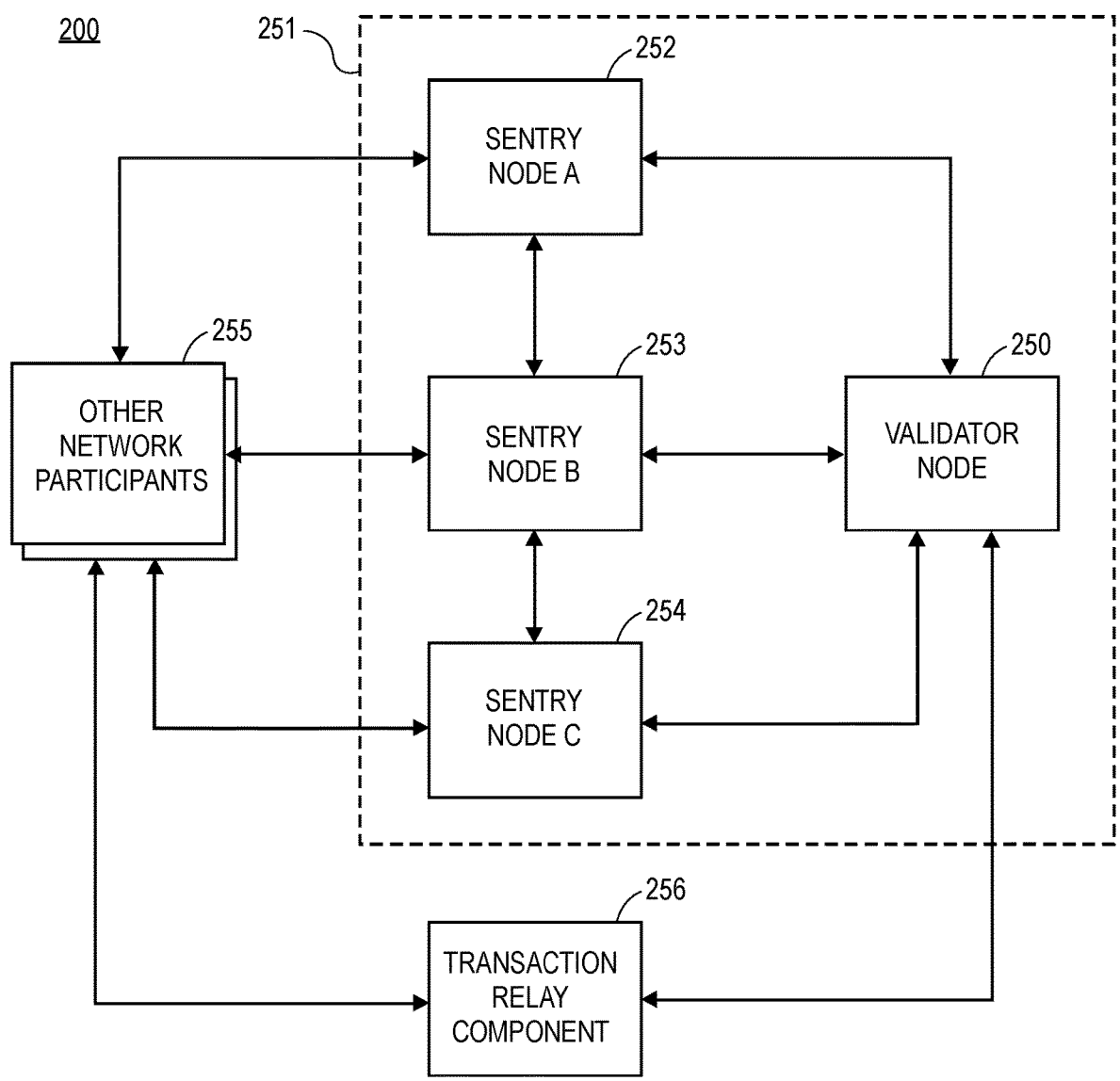
FIG. 2 depicts an overview of a system 200 including various of the components associated with a Layer-2 scaling solution for a blockchain, in accordance with some embodiments.

FIG. 2 illustrates an overview of a system 200 including various of the components associated with a Layer-2 scaling solution for a blockchain, such as that described with respect to FIG. 1. While illustrated and described as part of a Layer-2 scaling solution, it should be appreciated that the system 200 and its components may be implemented as part of a Layer-1 blockchain.

FIG. 2 includes a validator infrastructure 251 and a set of other network participants 255. The validator infrastructure 251 may include a validator node 250 and a set of sentry nodes 252, 253, 254. Generally, the validator node 250 may be configured to produce blocks, vote on consensus-related matters, and ensure that any protocol rules are being followed. Further, each of the sentry nodes 252, 253, 254 may communicate with the set of other network participants 255 and pass on relevant information to the validator node 250, thus acting as a firewall and ensuring that the validator node 250 is not directly exposed to potential attackers. It should be appreciated that each of the set of other network participants 255 may be configured with a similar validator infrastructure that includes a validator node and a set of sentry nodes.

FIG. 2 further includes a transaction relay component 256 that may be employed in association with profitable opportunities that may be present in a mempool. In particular, the transaction relay component 256 and related components may support an auction smart contract which may facilitate bidding among transaction submitters to gain priority transaction ordering for a specific opportunity-creating transaction. According to embodiments, a transaction submitter may be a searcher such as an operator of an MEV (maximal extractable value) bot, which may monitor a mempool to detect profitable arbitrage opportunities (e.g., backruns or liquidations) that are created by specific transactions. The searchers may be configured with one or more devices that implement automated bots that can create and broadcast transactions quickly to exploit these opportunities and capture profits. For example, when a large trade hits a DEX router contract, it often creates a price discrepancy between exchanges that can be arbitraged, where the fastest searcher bot to send a follow-up transaction may be able to capture that profit. Thus, the transactions may contain a bid for the right to be the transaction that immediately follows the opportunity transaction. Accordingly, the searchers may be competitive agents trying to maximize profits from blockchain events using speed and priority transaction ordering, where the auction smart contract enables searches to bid for preferential treatment by paying validators instead of blindly spamming the network.

The auction smart contract may be configured for use both by searchers and validators, where the auction smart contract may include two distinct parts: the "validator vault" and the "searcher relay." According to embodiments, the validator vault may be an escrow-like account in which proceeds to which validators are entitled are stored. A "rounds" system enables for, at the end of a round, all of the revenue a validator has accrued becoming available for withdrawal. The duration of each round may vary (e.g., a week, or other lengths).

The searcher relay part of the auction smart contract may enable searchers to participate in opportunity-creating transactions. In particular, a searcher transaction may call a "submit" function in the auction smart contract, where any searcher transaction with a "to" parameter that is not included in the auction smart contract may be rejected. Further, in the call arguments, the searcher may specify its bid amount, the transaction hash of the opportunity-creating transaction, its own smart contract address, and the input data (bytes) with which to call its smart contract. A given transaction bundle may be submitted by a searcher to the transaction relay component 256 via an application programming interface (API).

Thus, according to embodiments, the transaction relay component 256 and the associated auction smart contract may be configured to enable searchers detecting profitable opportunities in the mempool to submit transaction bundles to the transaction relay component 256 containing the opportunity transaction and their own transaction.

Upon receiving a new opportunity transaction bundle, the transaction relay component 256 may start an auction between searchers wanting to place their transaction after the opportunity transaction. In embodiments, the auction may run for a duration of time, for example 100-400 ms, or other durations. Further, the transaction relay component 256 may propagate the opportunity transaction to peer nodes such as to notify other searches of the opportunity transaction. The transaction relay component 256 may receive, from each of a set of additional searchers, a transaction bundle with the same opportunity transaction as well as its own transaction, whereby any transaction bundle that the transaction relay component 256 receives before the end of the auction will be placed into the same auction. At the end of the auction, the opportunity transaction and the searcher transactions may be sent to the validator node 250. These functionalities are described in further detail with respect to FIGS. 3A and 3B.

Figure 3A:
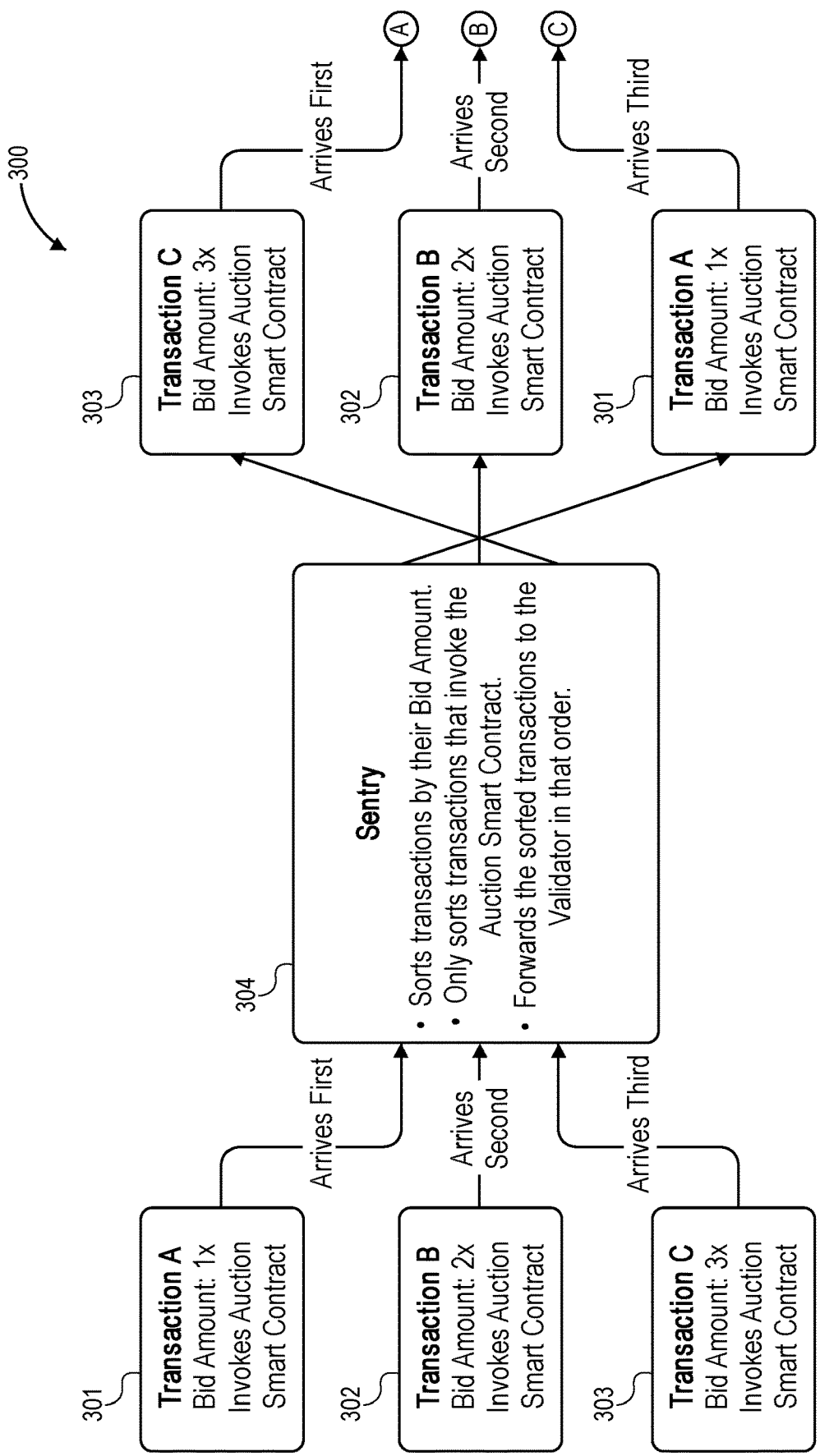
FIGS. 3A and 3B illustrate various components and functionalities associated with managing and processing blockchain transactions resulting from an auction, in accordance with some embodiments.
Figure 3B:
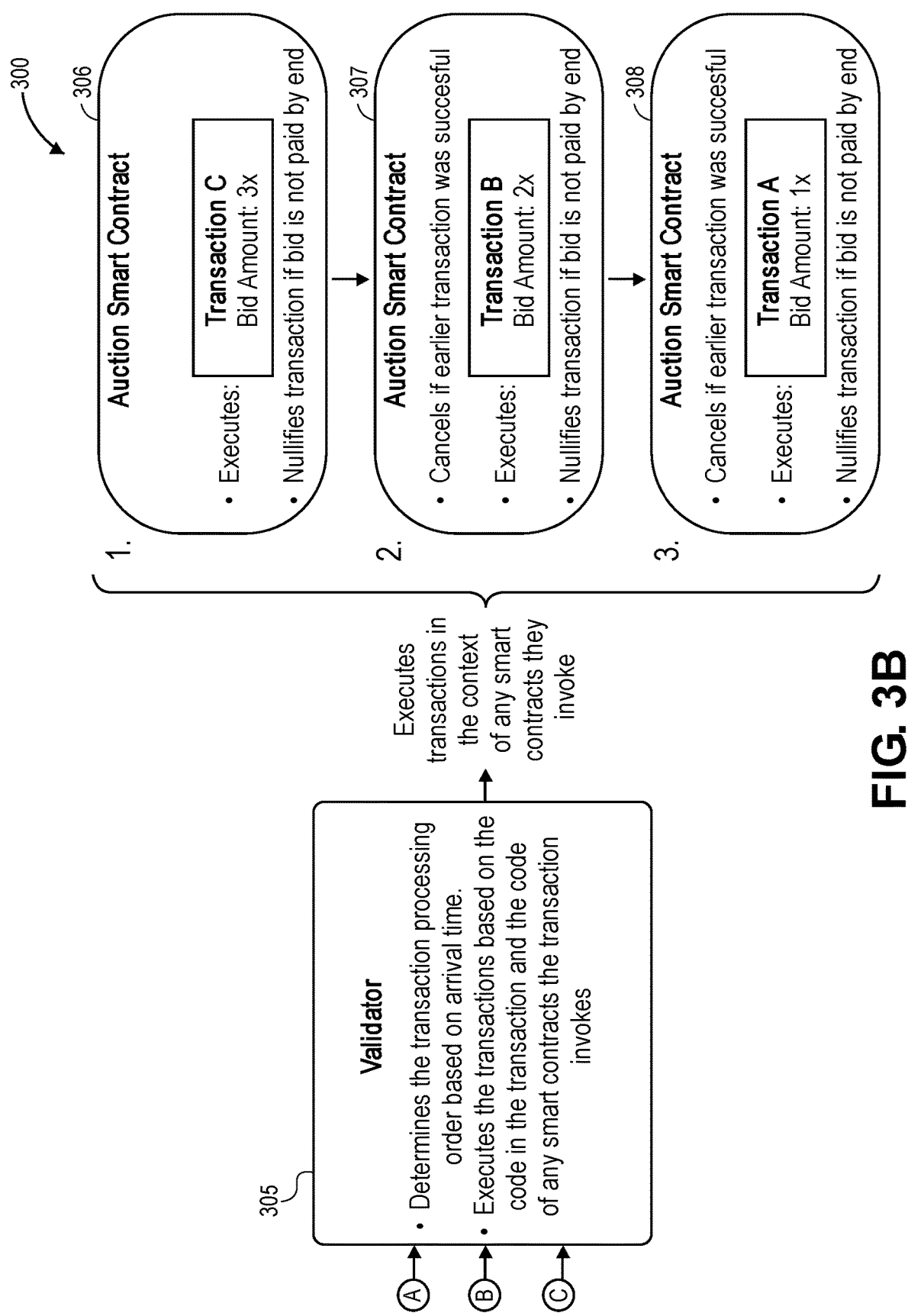

FIGS. 3A and 3B illustrate an overview 300 of various components and functionalities associated with managing and processing transactions resulting from an auction. In particular, the overview 300 relates to managing and processing transactions that are associated with the transaction relay component 256 as described with respect to FIG. 2.

The overview 300 indicates three (3) example transactions: Transaction A 301, Transaction B 302, and Transaction C 303, where the transactions 301, 302, 303 may be received at a sentry node 304 from one or more submitting devices, each associated with a searcher. For example, Transaction A 301 may be received from a first submitting device, Transaction B 302 may be received from a second submitting device, and Transaction C 303 may be received from a third submitting device.

As shown in FIG. 3A, Transaction A 301 arrives at the sentry node 304 first, Transaction B 302 arrives at the sentry node 304 second, and Transaction C 303 arrives at the sentry node 304 third. In embodiments, the transactions 301, 302, 303 may be submitted by one or more submitting devices during the duration of an auction that is associated with an opportunity-creating transaction, where the auction may have a time period (e.g., between 100-400 ms, or other time periods). It should be appreciated that one of the transactions 301, 302, 303 may be a bundle transaction that may include an opportunity-creating transaction as well as a transaction specifying a bid, wherein the bundle transaction may trigger or cause the auction to start. Further, a given auction may have an associated auction smart contract that facilitates bidding among the submitting devices to gain priority transaction ordering for a specific opportunity-creating transaction, where each submitting device may be configured to integrate with the auction smart contract to enable its signing account, build valid bundles, and handle reverts if the submitter does not win the auction.

Each of the transactions 301, 302, 303 may indicate a bid amount: 1× for Transaction A 301, 2× for Transaction B 302, and 3× for Transaction C 303. According to embodiments, the bid amount refers to the amount of a given cryptocurrency (e.g., MATIC) that the submitter of the transaction is willing to pay to a validator in order to gain priority ordering for its transaction in the auction.

The sentry component 304 may be configured to receive the transactions 301, 302, 303 and sort or order the transactions 301, 302, 303 according to their bid amounts. According to embodiments, the sentry component 304 may be configured to sort any transaction that invokes the corresponding auction smart contract, and not sort any transactions that do not invoke the corresponding auction smart contract. In particular, the sentry component 304 may interact with the auction smart contract by ensuring that any transaction accepted into an opportunity auction by the sentry component 304 is a function call to the auction smart contract which references a transaction ID of an opportunity transaction.

As illustrated in FIG. 3A, the sentry component 304 may sort the transactions 301, 302, 303 according to their bid amounts: with Transaction C 303 first, Transaction B 302 second, and Transaction A 301 third. Further, the sentry component 304 may provide the sorted transactions 303, 302, 301 to a validator component 305 such that the transactions 303, 302, 301 arrive at the validator component 305 in the following order: Transaction C 303 first, Transaction B 302 second, and Transaction A 301 third.

Because the transactions are received by the validator component 305 in the order of their bid amount, the auction smart contract may initially determine whether this auction has already been completed. That is, the "auction ID" may be the hash function of the opportunity transaction hash and the gasPrice of the transaction, and if another searcher transaction has already completed without revert using that ID, all subsequent transactions with the same ID will automatically revert. According to embodiments, the addition of the gasPrice to the ID is to prevent an attacker from "blocking" the opportunity via a higher gas price.

According to embodiments, the validator component 305 may be configured to determine a transaction processing order based on the arrival times of the transactions 303, 302, 301. Further, the validator component 305 may be configured to execute, cancel, or nullify each of the transactions 303, 302, 301 based on the code included in each transaction and the code of any auction smart contract that each transaction invokes.

FIG. 3B further illustrates the execution, cancelation, and/or nullification of the transactions 303, 302, 301 by the validator component 305. In particular, the validator component 305 may process (306) Transaction C 303 by executing Transaction C 303 at a bid amount of 3×. In particular, Transaction C 303 calls the auction smart contract to finalize the bid at a bid amount of 3×, where Transaction C 303 specifies the amount that the submitter of Transaction C 303 is committed to pay. Further, the specified amount is transferred to the auction smart contract, which determines whether the specified amount matches the original bid amount.

For example, if the original bid amount for a winning transaction is 30 MATIC and the specified amount that was transferred is 20 MATIC, the amounts do not match. If the amounts do not match, the auction smart contract reverts the entire transaction by reverting the specified amount that was transferred back to the submitter of Transaction C 303. If the amounts match, the auction smart contract transfers the specified amount that was transferred to a balance associated with validator nodes including the validator 305 (e.g., to a "validator vault"). The validator 305 may then withdraw earnings associated with the auction, and any other auction having proceeds to which the validator 305 is entitled, from the balance (e.g., from the validator vault). In embodiments, the validator 305 may withdraw the earnings after completion of a "round" which is a period of time after which auction earnings are finalized.

In the example illustrated in FIG. 3B, if the amounts associated with Transaction C 303 do not match, the validator component 305 may process (307) Transaction B 302 by executing Transaction B 302 at a bid amount of 2×. Similar to the processing of Transaction C 303, the processing of Transaction B 302 may involve the auction smart contract determining whether the specified amount that was transferred by the submitter of Transaction B 302 matches the original bid amount (i.e., 2×). If the amounts do not match, the auction smart contract reverts the entire transaction by reverting the specified amount that was transferred back to the submitter of Transaction B 302. If the amounts match, the auction smart contract transfers the specified amount that was transferred to a balance associated with validator nodes including the validator 305. The validator 305 may then withdraw earnings associated with the auction from the balance, such as after completion of a round.

In the example illustrated in FIG. 3B, if the amounts associated with Transaction B 302 do not match, the validator component 305 may process (308) Transaction A 301 by executing Transaction A 301 at a bid amount of 1×. Similar to the processing of Transaction C 303 and Transaction B 302, the processing of Transaction A 301 may involve the auction smart contract determining whether the specified amount that was transferred by the submitter of Transaction A 301 matches the original bid amount (i.e., 1×). If the amounts do not match, the auction smart contract reverts the entire transaction by reverting the specified amount that was transferred back to the submitter of Transaction A 301. If the amounts match, the auction smart contract transfers the specified amount that was transferred to a balance associated with validator nodes including the validator 305. The validator 305 may then withdraw earnings associated with the auction from the balance, such as after completion of a round.

Assuming that the specified amount that was transferred matches the original bid amount for one transaction, the auction smart contract may generate an event indicating that the transaction completed, where the event may include certain data like an auction ID, an ID of the validator 305, and/or other data. Further, the validator 305 may create a block indicating the transaction and propagate the block to any sentry and peer nodes of the validator 305. The sentry and peer nodes receive, validate, and add the block to their own copy of the blockchain such that the transaction is recorded on the blockchain. Additionally, the block is "gossiped" back out to other nodes in the network via the p2p protocol, and the other nodes in the network may verity that the block has been built correctly following the rules of the network.

Figure 4:
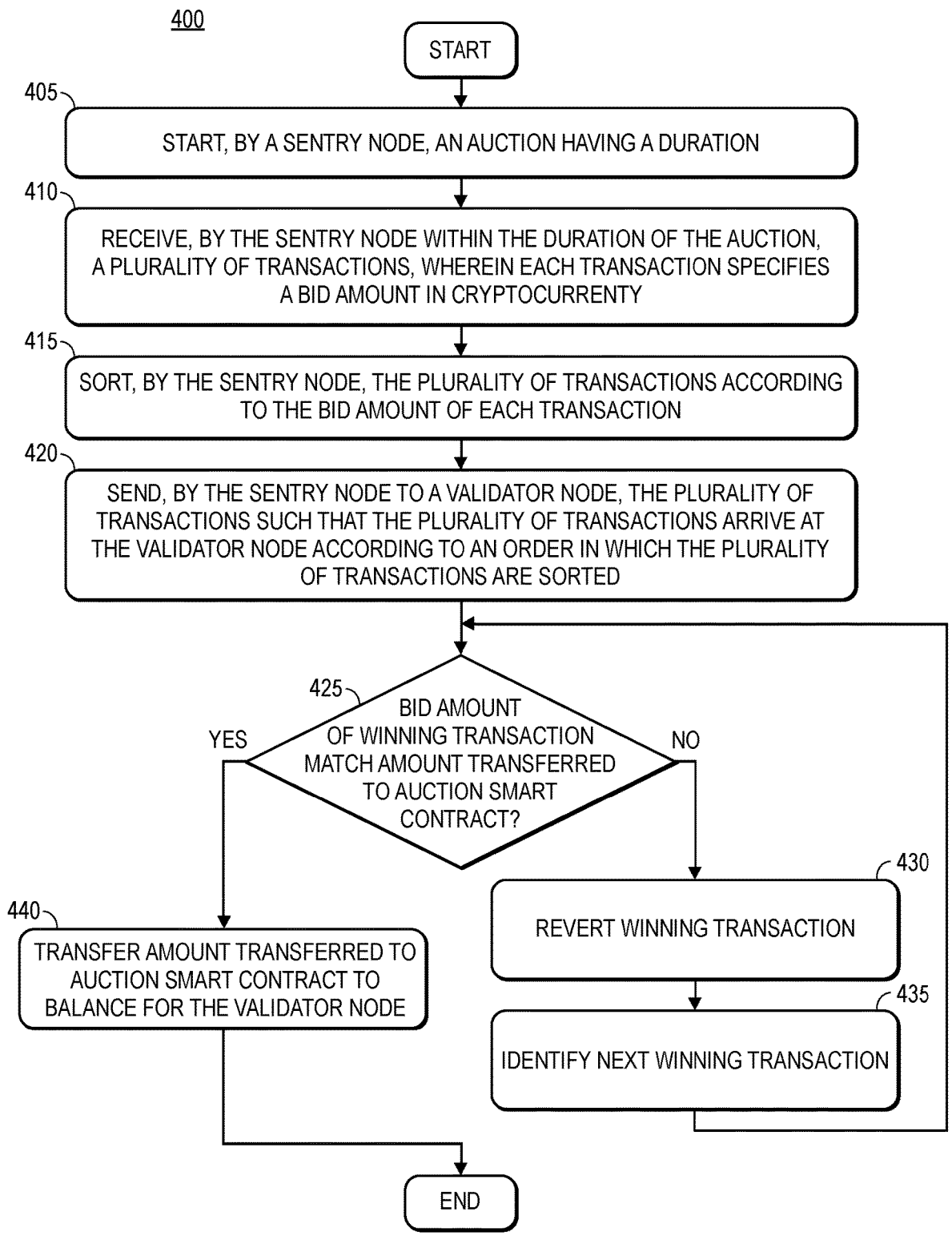
FIG. 4 is a block diagram of an example method of facilitating transactions on a blockchain, in accordance with some embodiments.

FIG. 4 depicts a block diagram of an example method 400 of facilitating transactions on a blockchain. The method 400 may be facilitated by one or more of the components of the system 200 or as included in the overview 300, as respectively described with respect to FIGS. 2, 3A, and 3B. In particular, the functionalities of the method 400 may be facilitated by a sentry node of a scaling solution (such as the sentry component 304), a validator node of the scaling solution (such as the validator component 305), and/or an auction smart contract(s) invoked by a transaction(s). While described as part of a Layer-2 scaling solution, it should be appreciated that the method 400 and its components and functionalities may be implemented as part of a Layer-1 blockchain.

The method 400 may begin with the sentry node starting (block 405) an auction having a duration. In embodiments, the sentry node may initially receive a bundle of transactions from a first submitting device of a plurality of submitting devices, wherein the bundle of transactions comprises an opportunity transaction and a first transaction. Further, in response to receiving the bundle of transactions, the sentry node may start the auction having the duration.

The sentry node may receive (block 410), within the duration of the auction, a plurality of transactions, wherein each transaction of the plurality of transactions may specify a bid amount in cryptocurrency, and where the first transaction may be included in the plurality of transactions. In embodiments, the plurality of transactions may be respectively received from a plurality of submitting devices, and each transaction may invoke an auction smart contract.

The sentry node may sort (block 415) the plurality of transactions according to the bid amount of each transaction. In embodiments, the sentry node may sort the plurality of transactions from a highest bid amount to a lowest bid amount. The sentry node may send (block 420), to the validator node, the plurality of transactions such that the plurality of transactions arrive at the validator node according to an order in which the plurality of transactions are sorted.

The validator node may execute a transaction of the plurality of transactions that arrives first at the validator node (i.e., the "winning" transaction). In particular, the validator node may execute the winning transaction at the bid amount specified by the transaction. Further, the winning transaction may specify an amount in cryptocurrency that a submitting device of the transaction is committed to pay, wherein the amount that is specified may be transferred to the auction smart contract invoked by the winning transaction.

The auction smart contract may determine (block 425) whether the bid amount of the winning transaction matches the amount transferred to the auction smart contract. If the bid amount does not match the amount transferred to the auction smart contract ("NO"), processing may proceed to block 430 at which the winning transaction may be reverted. In embodiments, the auction smart contract may revert the amount transferred to the auction smart contract back to the submitting device. Additionally, at block 435, the next winning transaction (i.e., the transaction that arrives at the validator node directly after the initial winning transaction) is identified, and processing may return to block 425. It should be appreciated that if there are no remaining transactions, then processing may end, repeat, or proceed to other functionality.

At block 425, if the bid amount matches the amount transferred to the auction smart contract ("YES"), processing may proceed to block 440 at which the winning transaction may be executed. In particular, the auction smart contract may transfer the amount transferred to the auction smart contract to a cryptocurrency balance (e.g., a validator vault) to which the validator node is at least partially entitled. Processing may then end, repeat, or proceed to other functionality.

Figure 5:
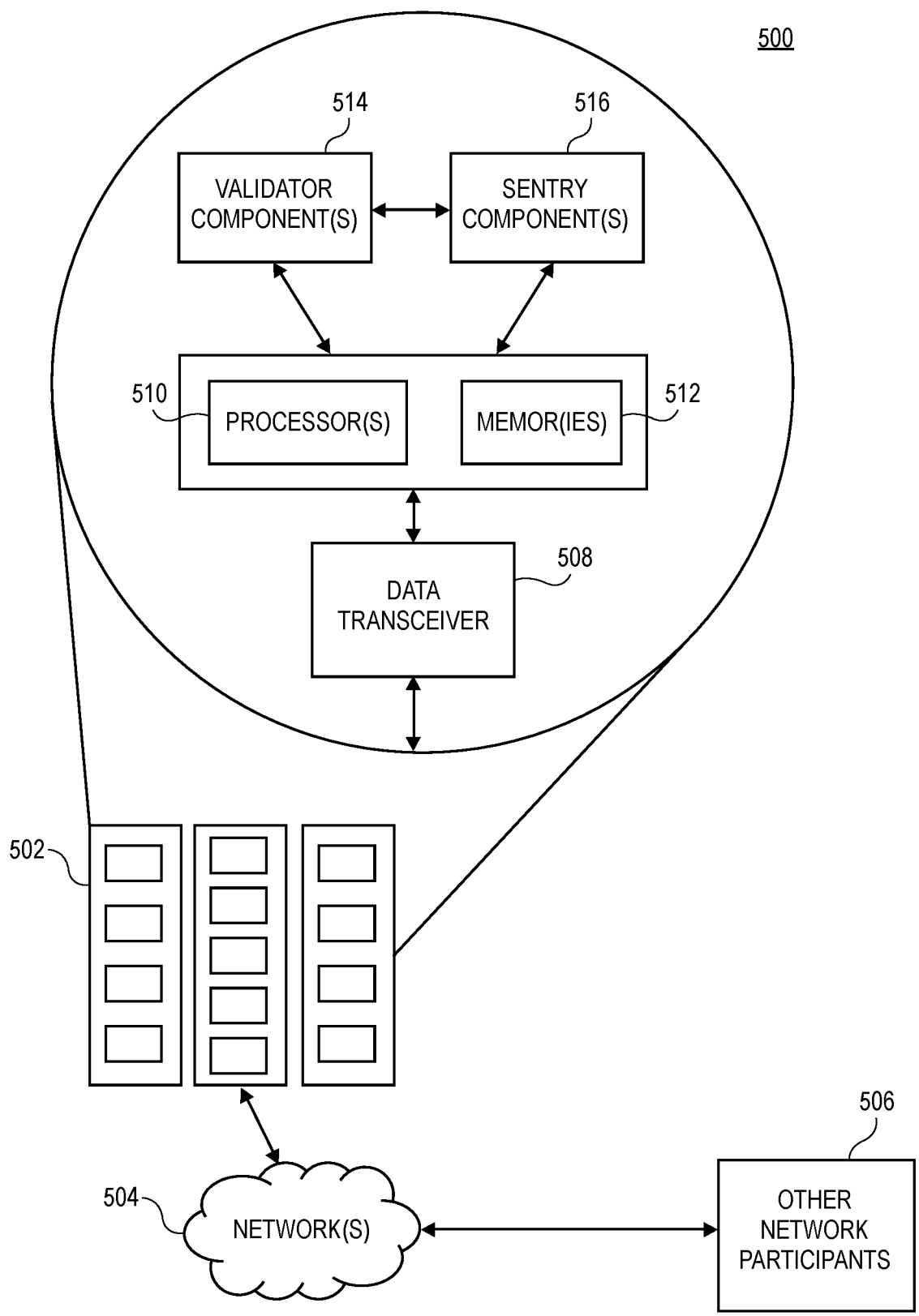
FIG. 5 is a schematic diagram of an example node in a distributed ledger system, in accordance with some embodiments.

FIG. 5 is a schematic diagram 500 of an example node 502 and its components in a distributed ledger system. The example node 502 may be in communication with other network participants 506 via a network 504. The node 502 includes various components for facilitating the functions of a node on the shared ledger network as described herein. In particular, the node 502 may include a data transceiver 508 for exchanging chain data with the other network participants 506 such as transactions and blocks. According to some embodiments, the data transceiver 508 may include one or more transceivers (e.g., WAN, WWAN, WLAN, and/or WPAN transceivers) functioning in accordance with IEEE standards, 3GPP standards, or other standards, and configured to receive and transmit data via one or more external ports.

The node 502 may further include a processor(s) 510 and memor(ies) 512 for storing shared ledger data and executable routines for executing the functions described herein, including storing auction smart contracts. The memor(ies) 512 may include one or more forms of volatile and/or nonvolatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The node 502 includes a set of validator components 514 for validating blocks and transactions received from the other network participants 506, and a set of sentry components 516 for accepting connections from the rest of the network participants 506 on behalf of the set of validator components 514. Generally, as discussed herein, the set of sentry components 516 may be configured to initiate auctions and receive transactions from submitting devices, sort the transactions, and provide the sorted transactions of the set of validator components 514. Further, the set of validator components 514 may invoke auction smart contracts to execute the sorted transactions received from the set of sentry components 516. Further, the set of validator components 514 may be configured to broadcast transactions to the other network participants 506 such that they are reflected on the underlying blockchain.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor(s) 510 to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of managing transactions associated with a blockchain, the computer-implemented method comprising:

receiving, by a sentry node associated with the blockchain, a plurality of transactions respectively from a plurality of submitting devices, wherein each transaction of the plurality of transactions specifies a bid amount in cryptocurrency;

sorting, by the sentry node, the plurality of transactions according to the bid amount of each transaction of the plurality of transactions;

sending, by the sentry node to a validator node, the plurality of transactions such that the plurality of transactions arrive at the validator node according to an order in which the plurality of transactions are sorted, wherein each of the sentry node and the validator node is part of a scaling solution associated with the blockchain; and executing, by an auction smart contract, a transaction of the plurality of transactions that arrives first at the validator node.

2. The computer-implemented method of claim 1, wherein executing the transaction comprises:

executing, by the auction smart contract, the transaction at the bid amount specified by the transaction.

3. The computer-implemented method of claim 1, wherein the transaction specifies an amount in cryptocurrency that a submitting device of the transaction is committed to pay, wherein the amount that is specified is transferred to the auction smart contract.

4. The computer-implemented method of claim 3, further comprising:
   determining, by the auction smart contract, whether the bid amount specified by the transaction matches the amount transferred to the auction smart contract.

5. The computer-implemented method of claim 4, wherein determining whether the bid amount specified by the transaction matches the amount transferred to the auction smart contract comprises:
   determining, by the auction smart contract, that the bid amount specified by the transaction does not match the amount transferred to the auction contract; and
   reverting, by the auction smart contract, the amount transferred to the auction smart contract back to the submitting device.

6. The computer-implemented method of claim 5, further comprising:
   after the auction smart contract reverts the amount transferred to the auction smart contract, executing, by the auction smart contract, an additional transaction of the plurality of transactions that arrives at the validator node after the transaction arrives at the validator node.

7. The computer-implemented method of claim 4, wherein determining whether the bid amount specified by the transaction matches the amount transferred to the auction smart contract comprises:
   determining, by the auction smart contract, that the bid amount specified by the transaction matches the amount transferred to the auction smart contract; and
   transferring, by the auction smart contract, the amount transferred to the auction smart contract to a cryptocurrency balance to which the validator node is at least partially entitled.

8. The computer-implemented method of claim 1, wherein receiving the plurality of transactions respectively from the plurality of submitting devices comprises:
   receiving, by the sentry node, a bundle of transactions from a first submitting device of the plurality of submitting devices, wherein the bundle of transactions comprises an opportunity transaction and a first transaction of the plurality of transactions;
   in response to receiving the bundle of transactions, starting, by the sentry node, an auction having a duration; and
   within the duration of the auction, receiving, by the sentry node, a remainder of the plurality of transactions respectively from a remainder of the plurality of submitting devices.

9. A system for managing transactions associated a blockchain, comprising:
   a sentry node associated with the blockchain and configured to:
      receive a plurality of transactions respectively from a plurality of submitting devices, wherein each transaction of the plurality of transactions specifies a bid amount in cryptocurrency,
      sort the plurality of transactions according to the bid amount of each transaction of the plurality of transactions, and
      send, to a validator node, the plurality of transactions such that the plurality of transactions arrive at the validator node according to an order in which the plurality of transactions are sorted, wherein each of the sentry node and the validator node is part of a scaling solution associated with the blockchain; and
   the validator node configured to invoke an auction smart contract to execute a transaction of the plurality of transactions that arrives first at the validator node.

10. The system of claim 9, wherein the auction smart contract executes the transaction at the bid amount specified by the transaction.

11. The system of claim 9, wherein the transaction specifies an amount in cryptocurrency that a submitting device of the transaction is committed to pay, wherein the amount that is specified is transferred to the auction smart contract.

12. The system of claim 11, wherein the auction smart contract is configured to determine whether the bid amount specified by the transaction matches the amount transferred to the auction smart contract.

13. The system of claim 12, wherein the auction smart contract determines that the bid amount specified by the transaction does not match the amount transferred to the auction smart contract, and wherein the auction smart contract is configured to revert the amount transferred to the auction smart contract back to the submitting device.

14. The system of claim 13, wherein after the auction smart contract reverts the amount transferred to the auction smart contract, the auction smart contract is configured to execute an additional transaction of the plurality of transactions that arrives at the validator node after the transaction arrives at the validator node.

15. The system of claim 12, wherein the auction smart contract determines that the bid amount specified by the transaction does not match the amount transferred to the auction smart contract, and wherein the auction smart contract is configured to transfer the amount transferred to the auction smart contract to a cryptocurrency balance to which the validator node is at least partially entitled.

16. The system of claim 9, wherein to receive the plurality of transactions respectively from the plurality of submitting devices, the sentry node is configured to:
   receive a bundle of transactions from a first submitting device of the plurality of submitting devices, wherein the bundle of transactions comprises an opportunity transaction and a first transaction of the plurality of transactions,
   in response to receiving the bundle of transactions, start an auction having a duration, and
   within the duration of the auction, receive a remainder of the plurality of transactions respectively from a remainder of the plurality of submitting devices.

\* \* \* \* \*